United States Patent
Vaganov

(10) Patent No.: US 7,554,167 B2
(45) Date of Patent: Jun. 30, 2009

(54) THREE-DIMENSIONAL ANALOG INPUT CONTROL DEVICE

(76) Inventor: Vladimir Vaganov, 129 El Porton, Los Gatos, CA (US) 95032

( * ) Notice: Subject to any disclaimer, the term of this patent is extended or adjusted under 35 U.S.C. 154(b) by 635 days.

(21) Appl. No.: 11/025,642

(22) Filed: Dec. 28, 2004

(65) Prior Publication Data
US 2005/0190152 A1    Sep. 1, 2005

Related U.S. Application Data

(60) Provisional application No. 60/533,409, filed on Dec. 29, 2003.

(51) Int. Cl.
*H01L 31/058* (2006.01)
(52) U.S. Cl. ............... 257/415; 257/730; 257/778; 257/E23.123; 257/E23.124
(58) Field of Classification Search ......... 257/E23.001, 257/E23.003, E23.116, E23.123
See application file for complete search history.

(56) References Cited

U.S. PATENT DOCUMENTS

| | | | |
|---|---|---|---|
| 4,680,577 A | 7/1987 | Straayer et al. | |
| 4,967,605 A | 11/1990 | Okada | |
| 5,035,148 A | 7/1991 | Okada | |
| 5,263,375 A | 11/1993 | Okada | |
| 5,489,900 A | 2/1996 | Cali et al. | |
| 5,499,041 A | 3/1996 | Brandenburg et al. | |
| 5,640,178 A | 6/1997 | Endo et al. | |
| 6,121,954 A | 9/2000 | Seffernick | |
| 6,195,082 B1 | 2/2001 | May et al. | |
| 6,211,558 B1 * | 4/2001 | Ismail et al. | 257/419 |
| 6,369,435 B1 * | 4/2002 | Igel | 257/415 |
| 6,373,265 B1 | 4/2002 | Morimoto et al. | |
| 6,388,299 B1 | 5/2002 | Kang et al. | |
| 6,441,503 B1 | 8/2002 | Webster | |
| 6,477,903 B2 | 11/2002 | Okada | |
| 6,518,954 B1 | 2/2003 | Chen | |
| 6,523,423 B1 | 2/2003 | Namerikawa et al. | |
| 6,530,283 B2 | 3/2003 | Okada et al. | |
| 6,534,711 B1 | 3/2003 | Pollack | |
| 6,570,556 B1 | 5/2003 | Liao et al. | |
| 6,642,857 B1 * | 11/2003 | Schediwy et al. | 341/20 |
| 6,654,004 B2 | 11/2003 | Hoggarth | |

(Continued)

OTHER PUBLICATIONS

USPTO, Notice of Allowance for 11804954 mailed Sep. 4, 2008, 8 pages.

*Primary Examiner*—Alexander G Ghyka
*Assistant Examiner*—Angel Roman
(74) *Attorney, Agent, or Firm*—Fitch, Even, Tabin & Flannery

(57) ABSTRACT

A method and device for 3-dimensional input finger control of different functions in electronic consumer devices is provided. Certain versions of the Present Invention provide a 3-dimensional input finger interface control device for cell phones, portable gamers, digital cameras, and other consumer devices. Certain alternate versions of the Present Invention exhibit one or more of the qualities of smallness, low-cost, high reliability, and/or high stability. Certain still alternate versions of the Present Invention provide a 3-dimensional input finger force control device that (1.) accommodates a required ratio between X, Y and Z sensitivities, (2.) has low cross-axis sensitivity, (3.) allows process integration with other sensors and CMOS, (4.) is scalable, (5.) allows convenient solutions for applying an external force, and/or (6.) allows economic manufacturability for high volume consumer markets.

17 Claims, 11 Drawing Sheets

U.S. PATENT DOCUMENTS

| | | |
|---|---|---|
| 6,654,005 B2 | 11/2003 | Wang |
| 6,697,049 B2 | 2/2004 | Lu |
| 6,707,445 B1 | 3/2004 | Hasemann |
| 6,750,408 B2 | 6/2004 | Inoue et al. |
| 6,753,850 B2 | 6/2004 | Poole |
| 6,771,992 B1 | 8/2004 | Tomura et al. |
| 6,774,887 B2 | 8/2004 | Lu |
| 6,787,865 B2 | 9/2004 | Endo et al. |
| 6,788,291 B2 | 9/2004 | Burry |
| 6,791,532 B2 | 9/2004 | Hirano et al. |
| 6,809,529 B2 | 10/2004 | Okada et al. |
| 6,809,721 B2 | 10/2004 | Love |
| 6,859,048 B2 | 2/2005 | Okada et al. |
| 6,903,724 B2 | 6/2005 | Grivas et al. |
| 6,920,041 B2 | 7/2005 | Oross et al. |
| 6,940,495 B2 | 9/2005 | Morimoto et al. |
| 6,950,092 B2 | 9/2005 | Buss |
| 6,952,197 B1 | 10/2005 | Nakamura et al. |
| 7,123,028 B2 | 10/2006 | Okada et al. |
| 7,123,240 B2 | 10/2006 | Kemppinen |
| 7,262,071 B2 | 8/2007 | Larmer et al. |
| 7,273,767 B2 | 9/2007 | Ong et al. |
| 2001/0003326 A1 | 6/2001 | Okada et al. |
| 2002/0075234 A1 | 6/2002 | Poole |
| 2002/0149564 A1 | 10/2002 | Simpson et al. |
| 2002/0151282 A1 | 10/2002 | Wang |
| 2002/0190949 A1 | 12/2002 | Hirano et al. |
| 2003/0030452 A1 | 2/2003 | Okada |
| 2003/0052861 A1 | 3/2003 | Peng |
| 2003/0076302 A1 | 4/2003 | Langstraat, Jr. |
| 2003/0094663 A1 * | 5/2003 | Sato et al. .................. 257/414 |
| 2003/0105076 A1 | 6/2003 | Ansari et al. |
| 2003/0105576 A1 | 6/2003 | Kamiya et al. |
| 2004/0027331 A1 | 2/2004 | Mochizuki et al. |
| 2004/0222968 A1 | 11/2004 | Endo |
| 2004/0227732 A1 | 11/2004 | Kemppinnen |
| 2005/0178214 A1 | 8/2005 | Okada et al. |
| 2007/0245836 A1 * | 10/2007 | Vaganov ................ 73/862.621 |
| 2008/0105936 A1 * | 5/2008 | Nakamura .................. 257/415 |

\* cited by examiner (a)

(b)

THREE-DIMENSIONAL ANALOG INPUT CONTROL DEVICE

CROSS-REFERENCES TO RELATED APPLICATIONS

This application is a Continuation to Provisional Patent Application No. 60/533,409 filed on Dec. 29, 2003, and which is incorporated herein by reference in its entirety and for all purposes.

BACKGROUND OF THE INVENTION

1. Field of the Invention

This invention relates to semiconductor devices, Micro Electro Mechanical Systems (MEMS), sensors and more specifically to three dimensional (3D) three-axis finger force sensors, finger-mouse and micro-joysticks for consumer and other applications.

2. Background

The 3D force sensors based on micromachined silicon chips with piezoresistors on the flexible diaphragm are known. Prior art shown in FIG. 1, uses a sensor chip 10 from a rigid frame 12 and rigid central part 16 of a die, boss, connected with the frame by a thinner diaphragm 14. The piezoresistors 18,24 are located at the periphery of the diaphragm adjacent to the frame 12 and to piezoresistors 20, 22 are adjacent to the boss 16 and electrically connected into three Wheatstone bridges through contact pads 26,28,30,32 accommodating X, Y and Z components of an applied force vector. The disadvantages of these kinds of known solutions can be summarized as: poor long-term stability due to the metal on the suspension; limited mechanical overload protection; large difference in X, Y, Z sensitivities; large cross-axis sensitivity; no process integration with other sensors and CMOS; no scaling; no solutions for convenient application from an external force; no solutions for providing required combination of applied force and deflection. Furthermore although there is a market need, no such semiconductor components reached the consumer market due to their high cost.

However there is a need for 3-dimensional input force control devices, which would be low cost, small, reliable, stable, providing required ratio between X,Y,Z sensitivities, low cross axis sensitivity, process integration with other sensors and CMOS, further scaling, convenient solutions for applying an external force, required combination of applied force and deflection and manufacturability for high volume consumer markets like cell phones, portable gamers, digital cameras, etc, using user tactile force inputs as part of the user interface. Furthermore, the need for 3-dimensional input control extends beyond X, Y, Z rectilinear coordinate systems to any orthogonal component system which may include other system position translation mappings or non-position dimensionality component mappings as well.

SUMMARY OF THE PRESENT INVENTION

A system and method of 3-dimensional input finger control for electronic device interfaces is presented. This interface device provides a variety of functions for hand-held device controlling directional inputs through the application of finger force. The invention method of 3-dimensional input finger control of different functions in device interfaces by decoupling the components of finger force vector with respect to axes of an orthogonal coordinate system, comprising the steps of 1) providing a semiconductor substrate sensor chip, said semiconductor sensor chip comprising a frame element, a rigid island element and an elastic element mechanically coupling said frame and said rigid island elements, 2) providing a set of three or more stress-sensitive IC components integrated into the elastic element and adjacent to the frame element for electrical connectivity to contact pad without connectivity via conductor traversal of elastic element surface, 3) coupling at least one force-transferring element from a tactile contact button element to a rigid island element of a sensor die, 4) transferring the applied external vector force from the button element through at least one force-transferring element to the rigid island element of the sensor die, and thereby generating electrical outputs from application the external force vector via stress-sensitive IC components positioned in the elastic element each carrying the unique orthogonal system component of signal from the force vector, where the IC component outputs are functions of input component stresses developed from the orthogonal system force components.

The method of 3-dimensional input finger control is further extended through the steps of 1) providing an electronic circuit logic for processing signals from sensors, 2) generating digital signals from the electronic circuit which are representative of the orthogonal component values from an applied external force on to the button, and 3) determining the force vector components of the applied three dimensional external force using the component signal values and the electronic circuit logic in solving at least three equations with at least three unknown vector components.

The apparatus claimed is comprised of a three-dimensional analog input control device for inputting analog mechanical signals into a digital processing system is described comprising 1) a sensor die formed within semiconductor substrate, 2) an elastic element within said semiconductor substrate, 3) a frame formed around said elastic element and coupled with at least part of the periphery of said elastic element all within the substrate, 4) at least three mechanical stress sensitive IC components located in the elastic element for providing electrical output signals proportional to the mechanical stress in the location of the IC components, 5) at least one rigid island element formed in the substrate and coupled with the elastic element; 6) at least one rigid force-transferring element coupled to the rigid island of a sensor die which transfers an external vector force to the elastic element and through the IC components which provide electrical output signal, 7) at least one spring element coupling the force-transferring element with an external and 8) at least one electronic circuit for processing output signals from the mechanical stress sensitive IC components using the component signal and the electronic circuit logic in solving at least three equations with at least three unknown vector components.

All elements can vary in design and material in order to realize different aspects and advantages.

A first alternate preferred embodiment of the method of the present invention provides an input device for inputting analog mechanical signals into a digital processing system, wherein the input device comprises, or is coupled with, one or more of the following elements or means:

a semiconductor substrate;

an elastic element formed in the semiconductor substrate;

a frame formed around an elastic element and connected with at least part of the periphery of the elastic element;

one or more mechanical stress sensitive components located in at least three different areas of an elastic element, and providing electrical output signals substantially proportional to the mechanical stress experienced at a location of at least one of these components;

a substantively rigid island or boss formed in a remote or central area of or from a frame and the island or boss-connected by at least three points with an elastic element;

means for transducing or transferring a force or pressure externally applied to the input device, e.g. a micro-mouse or a micro-joystick, from an exterior of the input device and to an island or boss, and a means for transferring pressure or force applied to the island or boss into a deformation of an elastic element by mechanical stress proximate to a location of sensitive components, and a means for providing at the same time a measurement range and measurement accuracy of external pressure or force and required motion or displacement of one or more elements of the input device;

a package or substrate providing integration of two, more than two or all the subcomponents, components or elements of the input device;

a semiconductor substrate and a means for transferring external force and providing mechanical and electrical connections of the device within the system;

an electronic circuit for processing output signals from the mechanical stress sensitive components and providing the separation of the three-dimensional output signals in either Cartesian or spherical system of coordinate;

a semiconductor substrate comprising material made with one or more elements selected from the IV group of the Periodic Table;

a semiconductor substrate comprising silicon;

a semiconductor substrate comprising germanium;

a semiconductor substrate comprising silicon carbide;

a semiconductor substrate comprising diamond like carbon;

a semiconductor substrate comprising material which comprises a compound of the elements from III and V groups of the Periodic Table;

a semiconductor substrate comprising gallium arsenide;

a semiconductor substrate comprising gallium nitride;

a semiconductor substrate comprising indium phosphide;

an elastic element formed in or coupled with the semiconductor substrate comprising or comprised within a diaphragm;

a diaphragm of or coupled with the semiconductor substrate material having a uniform thickness;

a uniform diaphragm formed in the semiconductor substrate having at least one boss located at some distance from the edge of the diaphragm;

a diaphragm formed in the semiconductor substrate that is thinner in at least one local area;

a diaphragm formed in the semiconductor substrate having corrugations in at least one local area;

a diaphragm formed in the semiconductor substrate having at least one through opening;

an elastic element formed in the semiconductor substrate comprising at least one beam connected with a central island or boss;

an elastic beam formed in the semiconductor substrate and the elastic beam having a substantively uniform thickness;

an elastic beam formed in the semiconductor substrate having a portion with at least one boss located at some distance from an end of the beam;

a diaphragm formed in the semiconductor substrate having at least a partial substantially rectangular shape;

a diaphragm formed in the semiconductor substrate having at least a partial substantially square shape;

a diaphragm formed in the semiconductor substrate having at least a partial substantially hexagonal shape;

a diaphragm formed in the semiconductor substrate having at least a partial substantially octagonal shape;

a diaphragm formed in the semiconductor substrate having at least a partial substantially circular shape;

a diaphragm formed in the semiconductor substrate having at least one stress concentrating element;

a diaphragm formed in the semiconductor substrate having a stress-concentrating element presenting a groove;

a diaphragm formed in the semiconductor substrate having a stress-concentrating element presenting a groove having a trapezoidal cross section;

a diaphragm formed in the semiconductor substrate having a stress-concentrating element comprising a V-groove;

a diaphragm formed in the semiconductor substrate having a stress concentrating groove having the sidewalls forming an angle in the range of $90°±5°$ with the surface of the diaphragm;

a diaphragm formed in the semiconductor substrate having at least one stress concentrating element comprises located on a beam;

a diaphragm formed in the semiconductor substrate having at least one stress concentrating element comprising a groove;

a diaphragm formed in the semiconductor substrate having at least one stress concentrating element comprising a groove having a trapezoidal cross section;

a diaphragm formed in the semiconductor substrate having at least one stress concentrating element comprising a V-groove;

a diaphragm formed in the semiconductor substrate having at least one stress concentrating element comprising stress concentrating groove having sidewalls forming an angle in the range of $90°±5°$ with a surface of a beam;

a frame formed around an elastic element used for connection or bonding with at least one additional element of sensor micro-construction;

a frame formed around an elastic element used for electrical and mechanical connection of a die with a package or a PCB of the system;

a frame formed around an elastic element used for connection or bonding with at least one additional element of a sensor micro-construction comprising a cap, protecting sensor from harmful effects of environment;

an additional element of a sensor micro-construction comprising a cap, protecting sensor from mechanical overload;

an element of a sensor micro-construction comprising a cap, providing damping of a mechanical resonant frequency of the sensor;

an element of a sensor micro-construction comprising an inlet and providing access of a physical parameter to the sensitive area of a sensor;

an element of a sensor micro-construction comprising a damper, the damper providing isolation of the transducing components of the sensor from mechanical and thermo-mechanical stresses, the stresses coming from the package, from inside the package and/or from outside of the package;

a frame formed around an elastic element used for integration of at least one additional electronic circuit;

an electronic circuit containing at least one amplifier;

an electronic circuit containing at least one multiplexer;

an where electronic circuit containing at least one analog-to-digital converter;

an electronic circuit containing at least one digital-to-analog converter;

an electronic circuit containing at least one microprocessor;

an electronic circuit containing flash memory;.

an electronic circuit containing EEPROM;

an electronic circuit containing I/O interface circuit;

a rigid island or boss formed in a remote or central area of from, or coupled with the frame and connected by at least three points to an elastic element at least partially formed at least partially in a shape substantively close to a pyramid, cone, cylinder, semi-sphere, sphere, and/or other suitable shape known in the art;

a rigid island or boss formed in a remote or central area of from, or coupled with the frame and connected by at least three points to an elastic element having a hole in the central part of the boss, wherein the hole may be substantively round, square, rectangular oval, and/or other suitable shape known in the art;

a rigid island or boss formed in a remote or central area of from, or coupled with the frame and connected by at least three points to an elastic element having an area of flat surface parallel to the initial plane of the wafer (laying in the plane of the initial surface of the wafer)

a rigid island or boss formed in a remote or central area of from, or coupled with the frame and connected by at least three points to an elastic element having at least one cavity or one mesa to improve coupling force (adhesion) with additional force-transferring elements;

a means for transferring measured force comprising a springy element mechanically connected with a rigid boss and providing transferring externally applied pressure and/or force and displacement into deformation and mechanical stress in the elastic element proportional to the force and/or displacement;

a force-transferring element comprising two links, a link connected directly to the boss and a second link connected to the first link and providing the connection with a source of externally applied pressure or force;

a force-transferring element having first link of a means for transferring applied force, the first link comprising a rigid element mechanically connected a rigid boss on an elastic element;

a rigid first link of a means for transferring applied force having at least one cavity or one mesa to improve coupling force with aplastic elastic second link of means for transferring applied force;

a force-transferring element at least partially in a shape of a washer, plate, stick, turned over mushroom, cone, or other suitable shape known in the art;

a first link of a means for transferring measured force comprising a springy element mechanically connected with a rigid boss;

a first link of a means for transferring a measured force comprising a springy element mechanically connected with a rigid boss, where the springy element comprises a springy wire;

a first link of a means for transferring a measured force comprising a springy element mechanically connected with a rigid boss, where the springy element comprises a spine-like structure;

a second link of a force-transferring element comprising a plastic shell, e.g., a cover, package, dome, or other suitable protective element known in the art, and connected to a first link and the second link while providing a connection to the input device to a source of an externally applied pressure or force;

a pressure or force-transferring element having at least one cavity filled in with liquid or gel providing transferring of externally applied pressure or force;

a pressure or force transferring element comprising silicon;

a pressure or force transferring element comprising metal or alloy;

a material comprised within a pressure or force transferring element containing at least one of the materials selected form the group consisting of copper, tin, lead, gold, silver, nickel, tungsten, and bismuth;

an intermediate layer coupling an elastic element and a pressure or force-transferring element, the intermediate layer comprising a polymer;

an intermediate layer coupling an elastic element and a pressure or force-transferring element, the intermediate layer comprising a solder;

an intermediate layer coupling the elastic element and pressure or force-transferring element, the intermediate layer comprising a frit-glass;

an intermediate layer coupling the elastic element and pressure or force-transferring element, the intermediate layer comprising a negative photoresist;

an adhesive coupling an elastic element and a pressure or force-transferring element, the adhesive comprising a polyimide based compound;

a stress sensitive component integrated at the surface of an elastic element, the stress sensitive component comprising a piezo-resistor;

a stress sensitive component integrated at the surface of -an elastic element, the stress sensitive component comprising a pn-junction;

a stress sensitive component integrated at the surface of an elastic element, the stress sensitive component integrated at the surface of an elastic element, the stress sensitive component comprising a tunnel diode;

a stress sensitive component integrated at the surface of an elastic element, the stress sensitive component comprising a shear stress component;

a stress sensitive component integrated at the surface of an elastic element, the stress sensitive component comprising a a Hall effect component;

a stress sensitive component integrated at the surface of an elastic element, the stress sensitive component comprising piezo-resistive Wheatstone bridge;

a stress sensitive component integrated at the surface of an elastic element, the stress sensitive component comprising a three-port-pole component integrated at the surface of elastic element;

a stress sensitive component integrated at the surface of an elastic element, the stress sensitive component comprising a three-port-pole component integrated at the surface of elastic element; having a MOS transistor;

a stress sensitive component integrated at the surface of an elastic element, the stress sensitive component comprising a complementary pair of CMOS transistors;

a stress sensitive component integrated at the surface of an elastic element, the stress sensitive component comprising a bipolar transistor;

a stress sensitive component integrated at the surface of an elastic element, the stress sensitive component comprising comprises a bipolar transistor and at least one piezo-resistor connected to a transistor;

a stress sensitive component integrated at the surface of an elastic element, the stress sensitive component comprising a MOS transistor and at least one piezo-resistor connected to a transistor;

a stress sensitive component integrated at the surface of an elastic element, the stress sensitive component comprising a pair of p-n-p and n-p-n bipolar transistors; and an electrical circuit providing at least one of the following functions: analog amplifying, analog multiplexing, analog-to-digital conversion, signal processing, memory for compensation coefficients, digital interface, power management, transmitting and receiving radio-signals, and management of charging of or from piezoelectric elements.

DETAILED DESCRIPTION OF THE PREFERRED EMBODIMENTS

Figure 1:
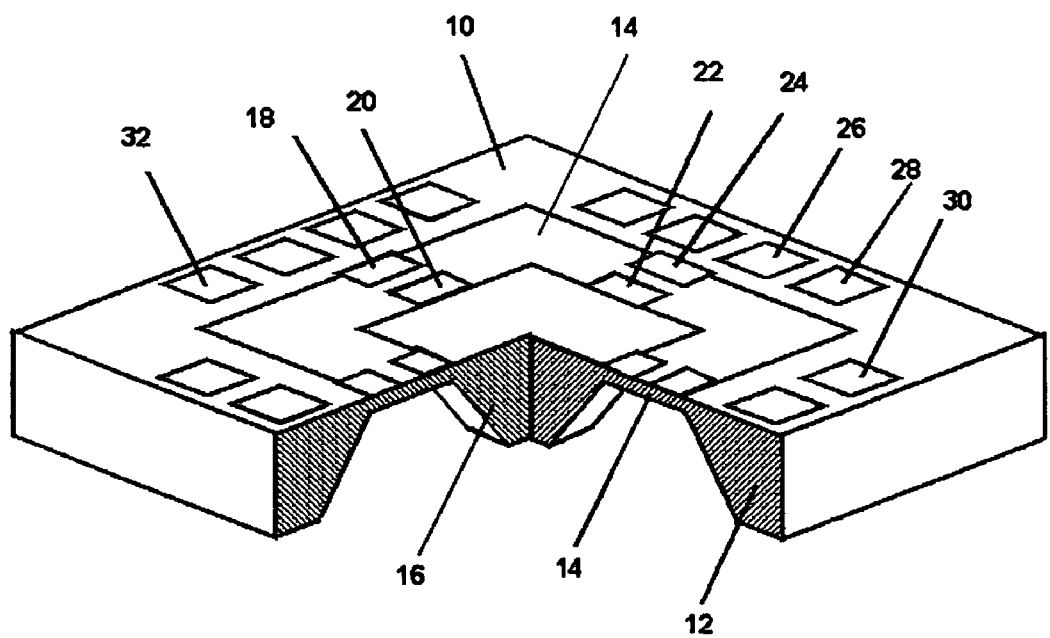
FIG. 1 is a view of a prior art 3D force sensor die.
Figure 2:
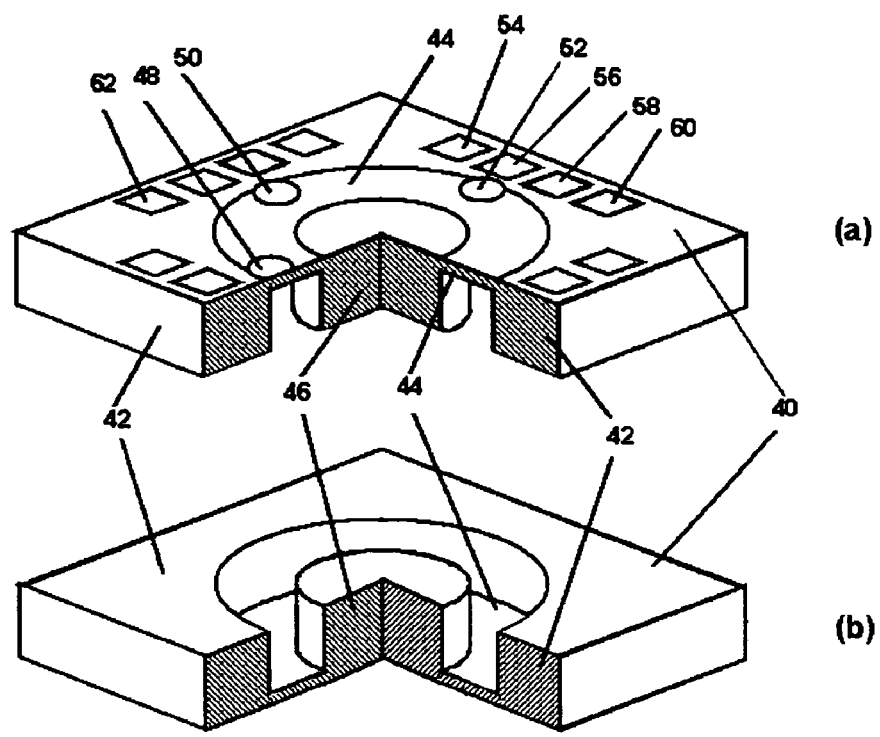
FIG. 2 shows an isometric top (a) and bottom (b) views of a force sensor die and its major micro-constructive elements according to the first embodiment of the present invention.

An object of the present invention is to provide a method of 3-dimensional input finger control of different functions in electronic consumer devices.

Another object of the present invention is to provide a 3-dimensional input finger interface control device for high volume consumer markets like cell phones, portable gamers, digital cameras, etc.

Another object of the present invention is to provide a low cost 3-dimensional input finger force control device.

Another object of the present invention is to provide a small size of a 3-dimensional input finger force control device.

Another object of the present invention is to provide a high reliability 3-dimensional input finger force control device.

Another object of the present invention is to provide a high stability 3-dimensional input finger force control device.

Another object of the present invention is to provide a 3-dimensional input finger force control device, which accommodates a required ratio between X,Y,Z sensitivities.

Another object of the present invention is to provide a 3-dimensional input finger force control device, which has low cross-axis sensitivity.

Another object of the present invention is to provide a 3-dimensional input finger force control device, which allows process integration with other sensors and CMOS.

Another object of the present invention is to provide a 3-dimensional input finger force control device, which is scalable.

Another object of the present invention is to provide a 3-dimensional input finger force control device, which allows convenient solutions for applying an external force.

Another object of the present invention is to provide a 3-dimensional input finger force control device, which allows required combination of applied force and deflection.

Another object of the present invention is to provide a 3-dimensional input finger force control device, which allows economic manufacturability for high volume consumer markets.

FIGS. 2-21 show various embodiments of finger force control devices and dice microstructures. The detailed description of the microstructures and devices according to the present invention are presented below in thirteen embodiments.

Referring to the embodiment of FIGS. 2(a)-(b), the isometric and a cross section view of the top planar side of the force sensor die and its major micro-constructive elements are shown in FIG. 2a. The isometric cross sectional view of the bottom side of the die are shown in FIG. 2b. The die 40 has frame 42 surrounding an elastic element 44. In this embodiment the elastic circular element 44 acts as a diaphragm. A central rigid island 46 is situated within the center of the diaphragm 44. On a circular diaphragm 44 planar top side there are a number of areas 48 50 52 where mechanical stress sensitive IC components are effectively located. The IC components 48 50 52 are located on the periphery of the diaphragm adjacent to a frame 42, and electrically connected to contact pads 54 56 58 60 62 without metal conductors on the surface of a diaphragm. This yields better sensor stability.

An externally applied force is transferred to the rigid island 46, the deflection of the island creates deformation and stress in the elastic diaphragm element 44, reaching the locations of the stress sensitive IC components 48, 50, 52. These three sensitive IC components create a unique combination of the signals relative to a specific value and direction of the applied vector force. Calibration and processing sensor signals allows determination of the values of the force vector components and therefore also the value and a direction of the externally applied force. Because the rigid island 46 is located within the thickness dimension of a die 40 and the width of a diaphragm is much smaller and in the sub-millimeter range, and deformation from external force in lateral X and Y directions are not sufficiently sensitive to provide good load following characteristics.

Figure 3:
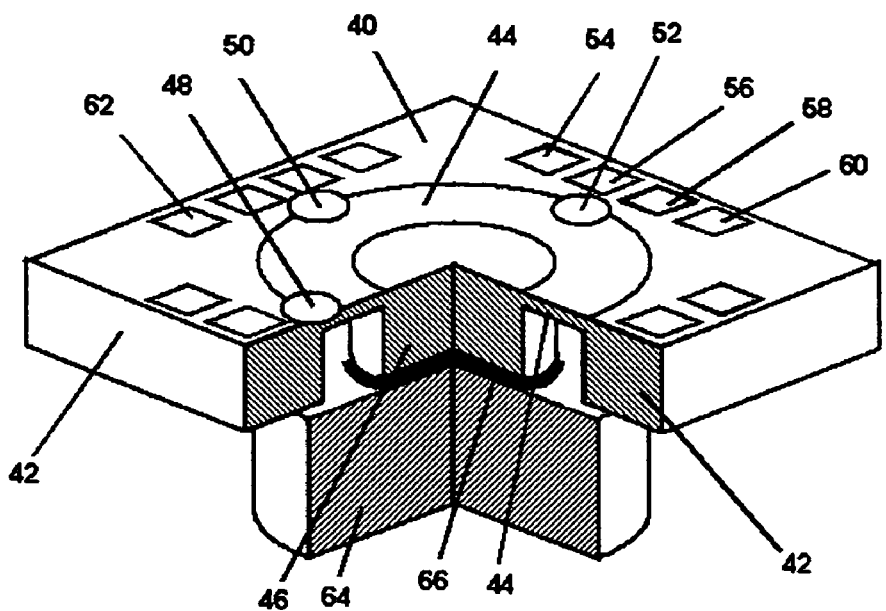
FIG. 3 shows and isometric cross-section view of a die with a rigid force-transferring element connected to the profiled side of a sensor die according to the second embodiment of the present invention.
Figure 4:
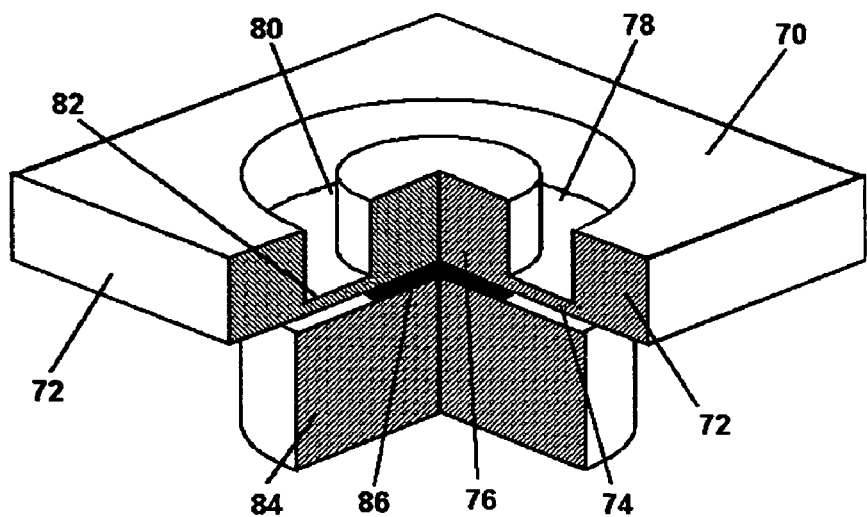
FIG. 4 shows an isometric cross-section view of a die with a rigid force-transferring element connected to the planar side of a sensor die according to the second embodiment of the present invention.
Figure 5:
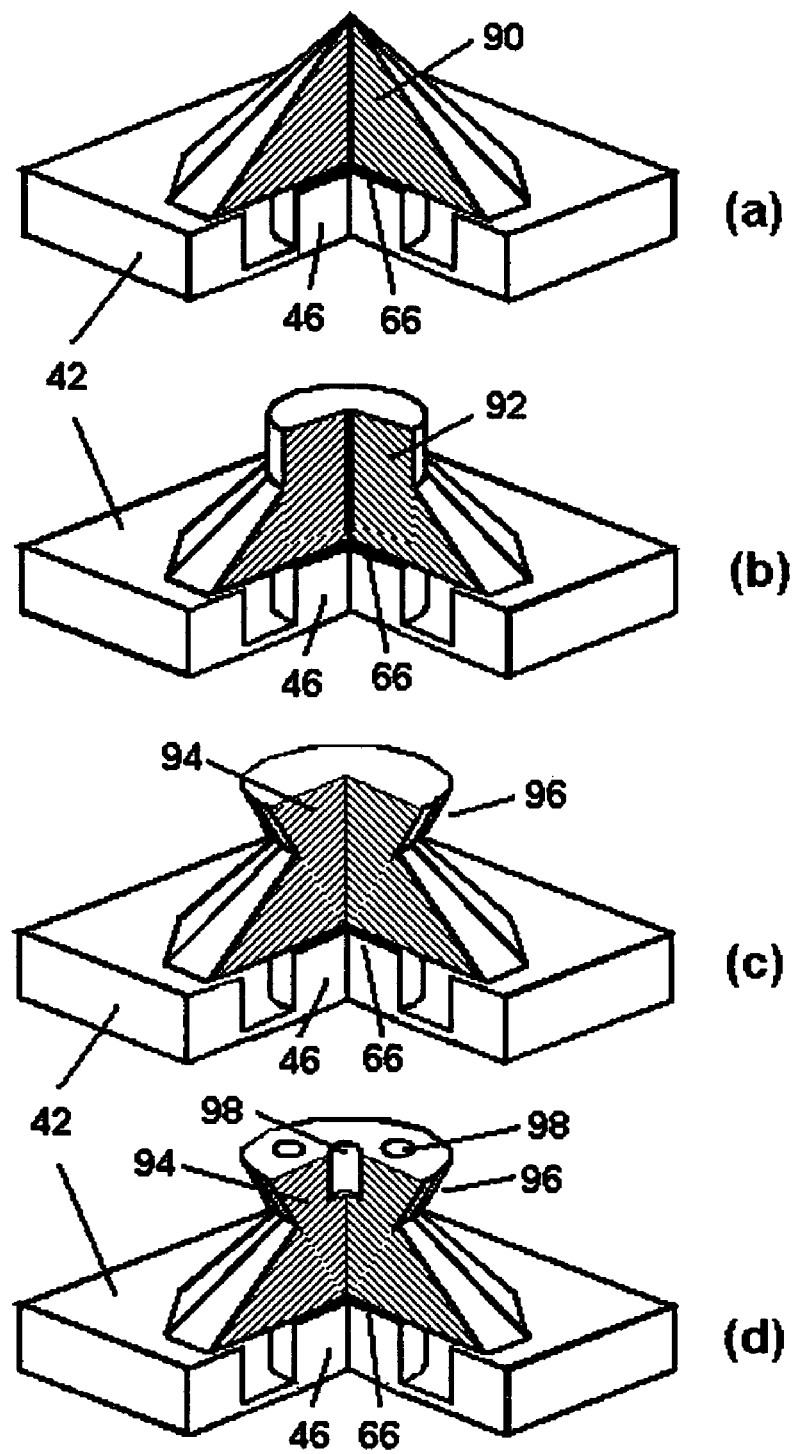
FIG. 5 a, b, c, d show isometric cross-sections of a die with alternate designs of a rigid force-transferring element connected to the profiled side of a sensor die, alternate transferring elements which provide alternate transfer force and gripping force according to the third embodiment of the present invention.
Figure 6:
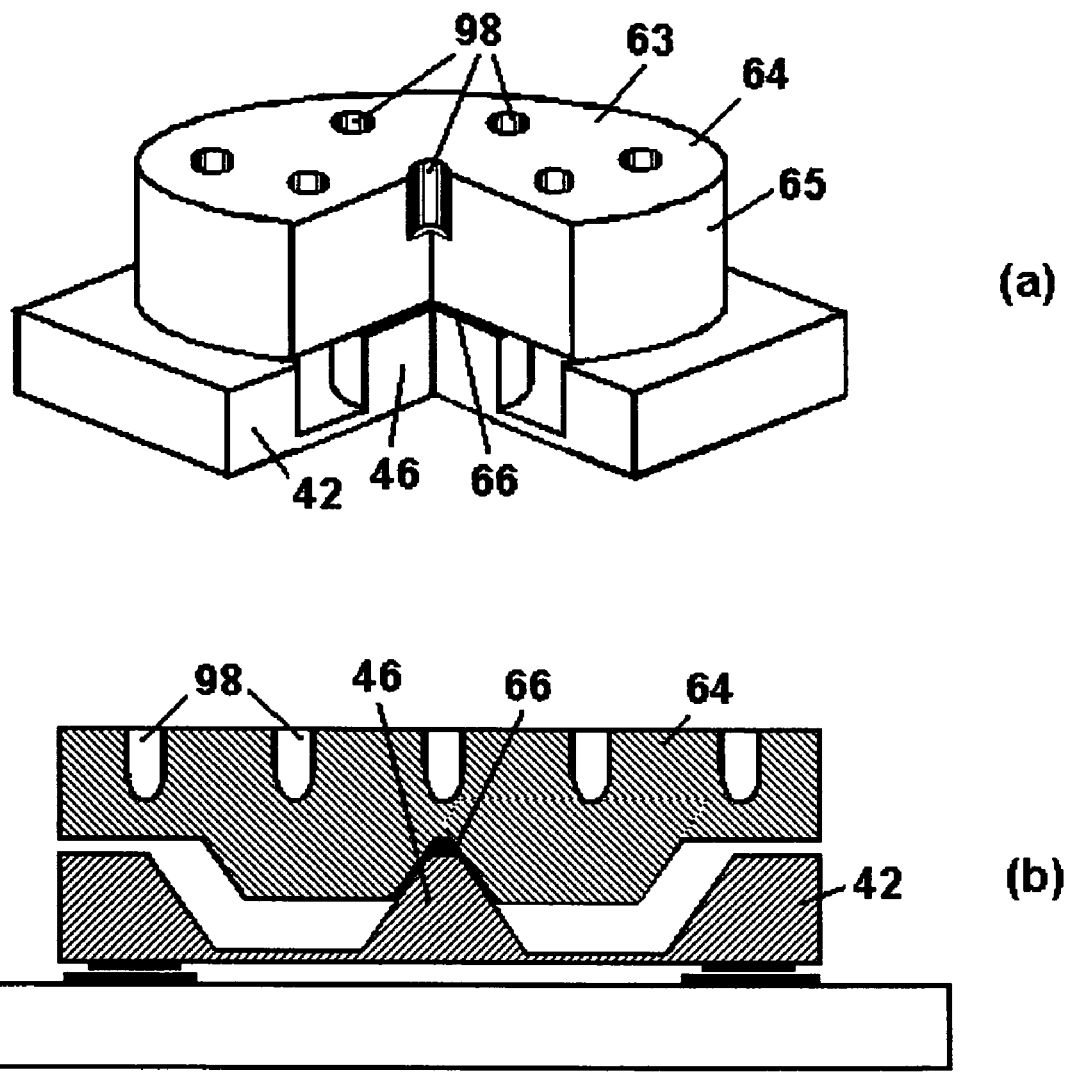
FIG. 6 a, b shows an isometric view and a cross-section of a die with a rigid force-transferring element connected to the profiled side of a sensor die, which has a comparable size with a sensor die and provide improved gripping force to the force-transferring element according to the fourth embodiment of the present invention.

In order to resolve this deficiency, in the microstructure, according to a second embodiment, as illustrated in the FIG. 3, a rigid force-transferring element 64 is added to the die 40 and island 46 structure. This rigid force-transferring element 64 is firmly coupled to the rigid island 46 of a sensor die 40 through a intermediate layer 66 at the wafer semi-conductor level. The cost of manufacturing is consequently reduced dramatically due to the batch processing economies of scale. The presented microstructure embodiment enhances sensor sensitivity to the applied vector force in all orthogonal directions following the rigid force-transferring element 64 stresses. These components of force are transferred to a rigid island of the sensor die and then to the elastic element and sensitive IC components. In this embodiment the rigid force-transferring element 64 is attached to a rigid island 46 from the backside of the wafer directly to the profiled island. In a wafer microstructure illustrated in FIG. 4, the rigid force-transferring element 84 is attached to a rigid island 76 from the planar side 78 of the die 70 through an intermediate layer 86 of an adhesive material. This rigid coupling does not extend to the remainder of a sensor die 72 either in the area of elastic element 74 or the frame 72 of the die. Both embodiments of FIG. 3 and FIG. 4 can be used depending on the requirements set forth to the entire construction of the sensor.

As illustrated in FIGS. 5(a)-(d) the micro-structure of a rigid force-transferring element can have a different shape according to a third embodiment. The rigid force-transferring element 90, as it shown in FIG. 5(a), has a multi-facet pyramid geometry attached to a rigid island 46 of a sensor die through an intermediate layer 66. The angled facets of the sidewalls of the rigid force-transferring element 90 are positioned for transferring all components of an applied force vector. Fabricate of this structure can be done by anisotropic etching of the patterned wafer of the rigid force-transferring elements. However, it does not provide the best adhesion to the external materials coupled to the top of the rigid force-transferring element 90, which is often required in practice.

The micro-structure shown in FIG. 5(b) provides some improvement. The microstructure of a rigid force-transferring element 92 has a blunt geometry providing more coupling surface and therefore a better adhesion to the external materials of the rigid force-transferring element, because, as a rule, the sheer force of adhesion to the cylindrical part of the element is much higher than the normal or angled to the surface adhesion force.

The microstructure shown in FIG. 5(c) provides even more improvement due to the increased coupling surface. The microstructure of a rigid force-transferring element 94 has a part of a microstructure with negative angle of sidewalls 96. If external material is applied to the rigid force-transferring element 94, then it will be hold stronger due to the negative slopes of the structure.

The micro-structure shown in FIG. 5(d) illustrates yet another improvement. The microstructure of a rigid force-transferring element 94, in addition to having microstructure with negative angle of sidewalls 96, also has micro-structural cavity 98 elements, or mesas, or bridges, or any other non-uniformities increasing an adhesion of external materials applied to the rigid force-transferring element 94.

In some cases, as it shown in FIGS. 6(a)-(b) according to a fourth embodiment, the size of a rigid force-transferring element 63 should be comparable to a size of a sensor die 42. In this case the top surface 63 of the rigid force-transferring element 64 is much higher than the sidewall surface 65 and therefore, the Z-component of the applied force can be transferred better than the X and Y components. In this situation it is more important to increase the adhesion of the external materials applied to a rigid force-transferring element in the direction of lateral X and Y forces. It can be done in a different ways. One of them is to create a number of non-uniformities like cavities 98, holes, mesas, bridges, etc., which will accept an external material and improve an adhesion to the rigid force-transferring element 63. The remaining sensor die element 42 and adhesion coupler 66 act as described above.

FIG. 6(b) illustrates similar approach achieved by anisotropic etching of both sensor die 42 and rigid force-transferring element die 64 wafers. The cavities 98 might be fabricated either with RIE, isotropic or anisotropic etching.

The challenge of practical application of described sensors, as input force controlled devices, is that the deflection of the rigid island of rigid force-transferring 64 element firmly connected to the rigid island 46 is negligible. The psychological reaction on the control of the applied force is based only on the applied force or, for example pressure on the finger in case of the finger force control. If the finger would have some range of deflection, then it would increase the accuracy of applying input signals providing at the same time the required range of applied force and sensitivity of the device.

Figure 7:
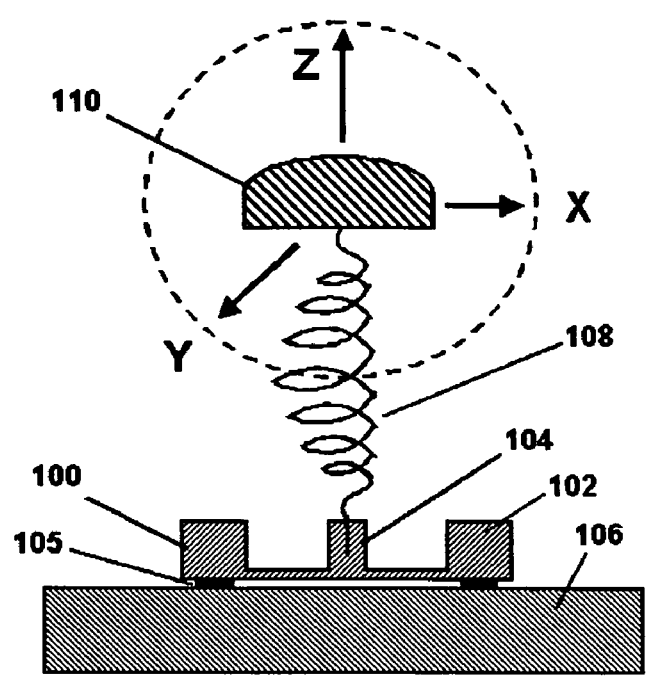
FIG. 7 shows the principle of a method of 3-dimensional input finger control of different functions in hand-held devices, where 3D force sensor die is connected to the external button for applying the force through a spring like element allowing control to achieve the required combination of sensitivity, range and accuracy of applied force according to the fifth embodiment of the present invention.

The embodiment design resolving this issue is illustrated in FIG. 7 according to a fifth embodiment. A two ended spring element 108 is added to a sensor. The first end of spring element 108 is coupled to a rigid island 104 of a sensor die 100, which has a frame 102 and contact pads 105. The second end of the spring element 108 is connected to a button 110, where the external force vector is applied. The spring element 108 phases the deflection, increases the range of motion or applied force and accuracy of the input mechanical signal. As another benefit, the spring element 108 also increases the range of the opportunities in designing the microstructure of the sensor die for better performance from variable stiffness, reliability and cost.

Figure 8:
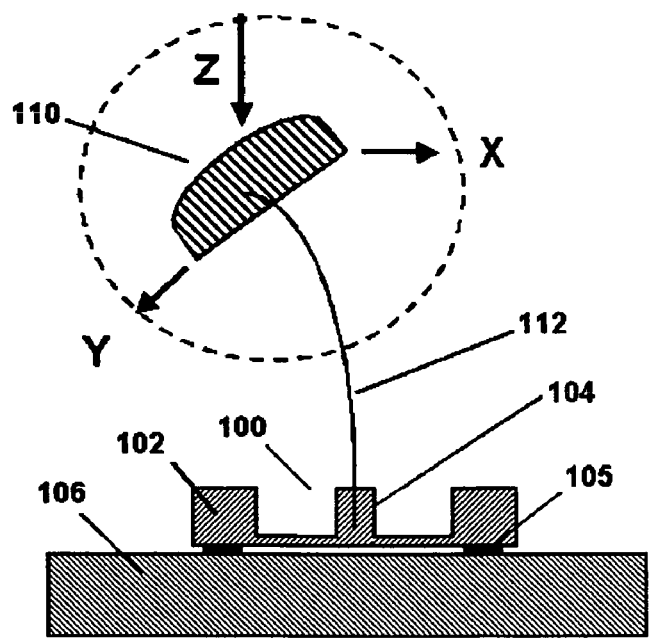
FIG. 8 shows an example of a spring like element, which can be a thin rigid wire, connecting external button force vector with sensor die according to the fifth embodiment of the present invention.

The spring element can be realized in many ways. FIG. 8 illustrates a simple embodiment of a spring element 112, in the form of a stiff wire 112 coupled to a button 110 on one end and a rigid island 104 on the other end. Applied force to a button 110 in different directions X, Y and Z is transferred through the wire spring element 112 and rigid island 104 to an elastic element and stress sensitive IC components in the sensor die element 102.

Figure 9:
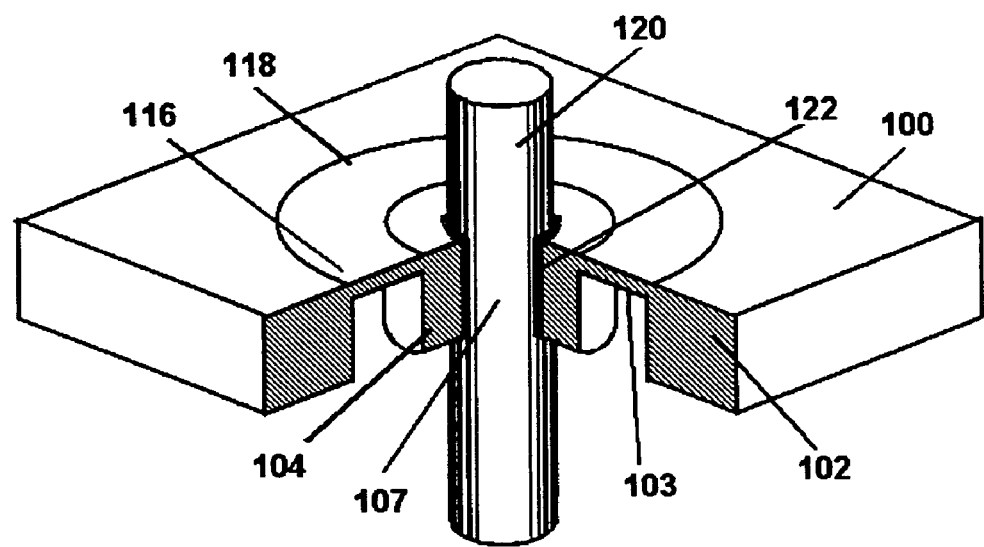
FIG. 9 shows how a spring element can be connected to the force sensor die according to the sixth embodiment of the present invention.

As illustrated in FIG. 9, a spring element 120 shown as a wire 120 is connected to a sensor die 100 according to a sixth embodiment. The opening 107 in the sensor die 100 was fabricated in the rigid island 104. The wire 120 is installed into a opening 107 and fixed there with the adhesive material layer 122. The wire 120 can be installed from either direction: from planar side of the die or from back profiled side of the die, depending on the final design of the package and the desired position of the die within the package.

Figure 10:
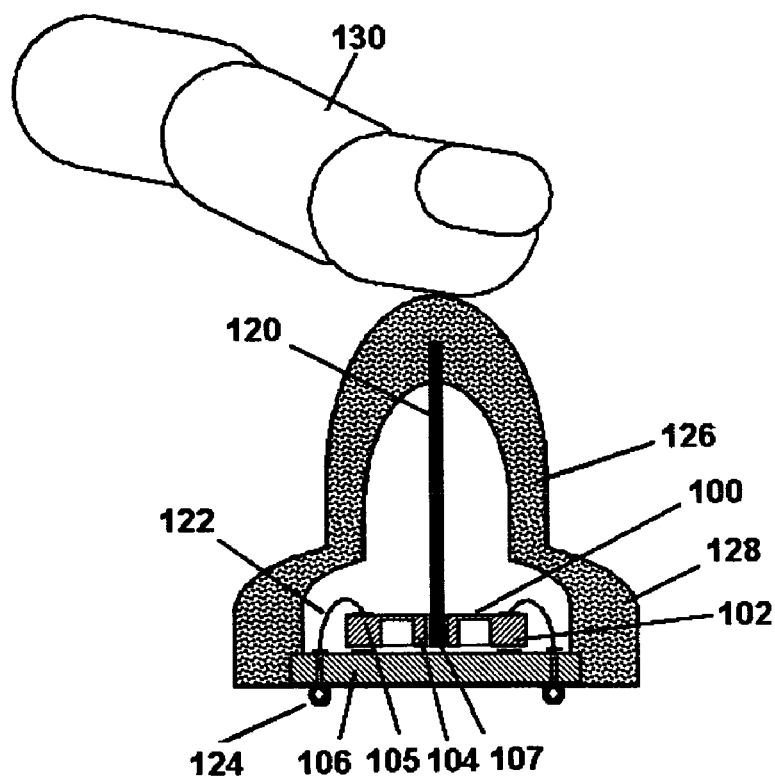
FIG. 10 shows an example of a finger force control device based on a spring like wire element connected to the force sensor die according to the sixth embodiment of the present invention.

FIG. 10 illustrates a version of the mutual positioning of the spring element wire 120 and the sensor die where the wire 120 is extended from the planar side of the die 100. The spring element wire 120 is connected to a rigid island 104 of the sensor die 100. The die is bonded to a substrate 106 in the area of the frame 102. The contact pads 105 of the die 100 are coupled with the bonded electrical wires 122 to external contact pads 124, which can be connected with for example solder balls. The external plastic package 128 anchors the substrate 106 and extends with its flexible part 126, as a pertruding elastomeric supporting the other end of a spring element wire 120 forming a button, where the external force, from the finger 130 force, can be applied.

Figure 11:
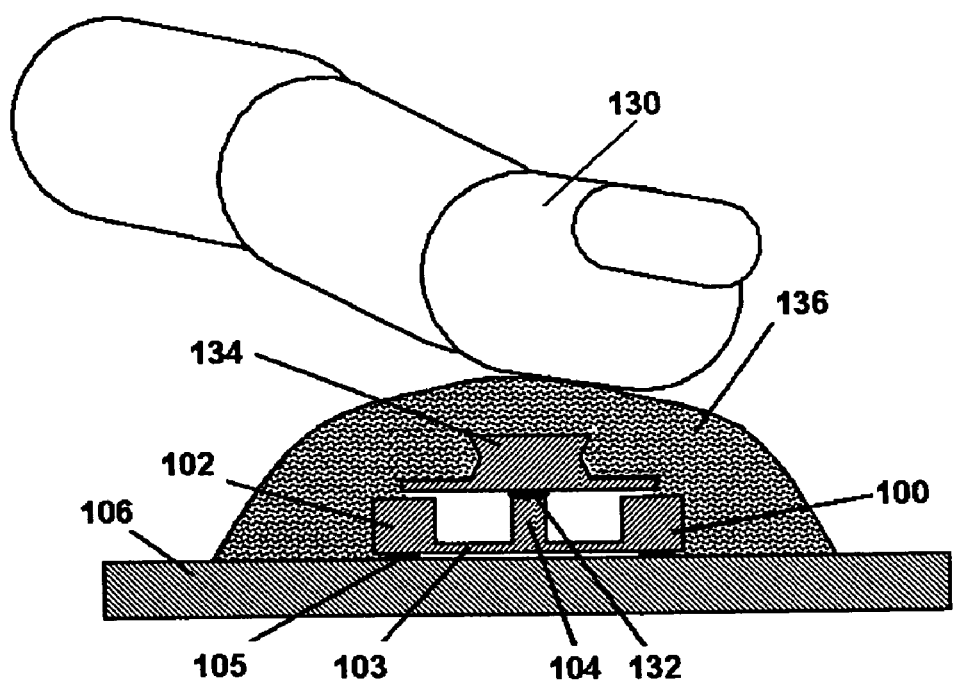
FIG. 11 shows an example of micro-construction of a flat finger force control device based on a elastomeric button directly connected to the rigid force-transferring element coupled to the force sensor die according to the seventh embodiment of the present invention.
Figure 12:
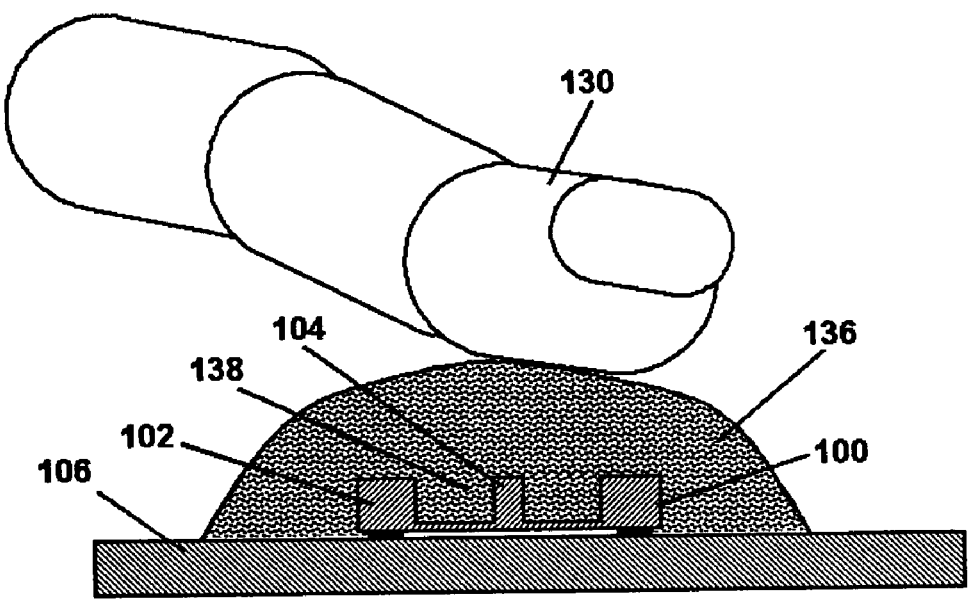
FIG. 12 shows an example of a flat finger force control device based on a elastomeric button directly connected to the force sensor die according to the seventh embodiment of the present invention.
Figure 13:
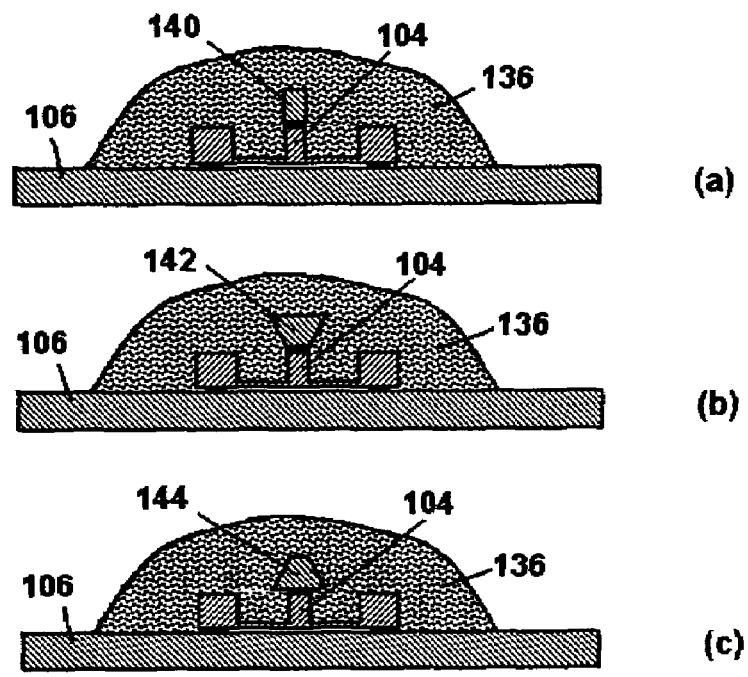
FIG. 13a, b, c show examples of flat finger force control device based on an elastomeric button directly connected to three rigid force-transferring elements according to the seventh embodiment of the present invention.

As illustrated in FIG. 11, for some finger mouse applications, where there is no need for a large deflection of a button an input force controlled devices can be shaped as a flat button according to a seventh embodiment. The sensor die 100 is bonded to a substrate 106 with the contact pads 105. Rigid force-transferring element 134 is bonded to a rigid island 104 of a sensor die 100 with intermediate layer 132. The sensor die 100 together with the rigid force-transferring element 134 are covered with elastic plastic material 136 forming a desired shape of a button. The external force is applied to an elastic button, for example by a finger 130. Normal and sheer force are transferred through the elastic material of a button to the rigid force-transferring element 134 and then to the rigid island 104, elastic element 103 and finally to the stress sensitive IC components, which result in output electrical signals proportional to external force.

Where the size of a sensor die and the viscosity and elasticity of an elastic material of the plastic button are compatible, a rigid force-transferring element may not be warranted, as is shown in the FIG. 12. The elastic plastic material 136 covers the sensor die 100 directly from the back profiled side filling in the cavity 138 between the frame 102 and the rigid island 104. Normal and sheer force applied by a finger are transferred through the elastic material of a button directly to the rigid island 104 and then to the stress sensitive IC components.

However, the presence of the rigid force-transferring element increases flexibility of design in order to meet differing application requirements. FIGS. 13(a)-(c) illustrate different design options for the rigid force-transferring element 140 142 144.

Figure 14:
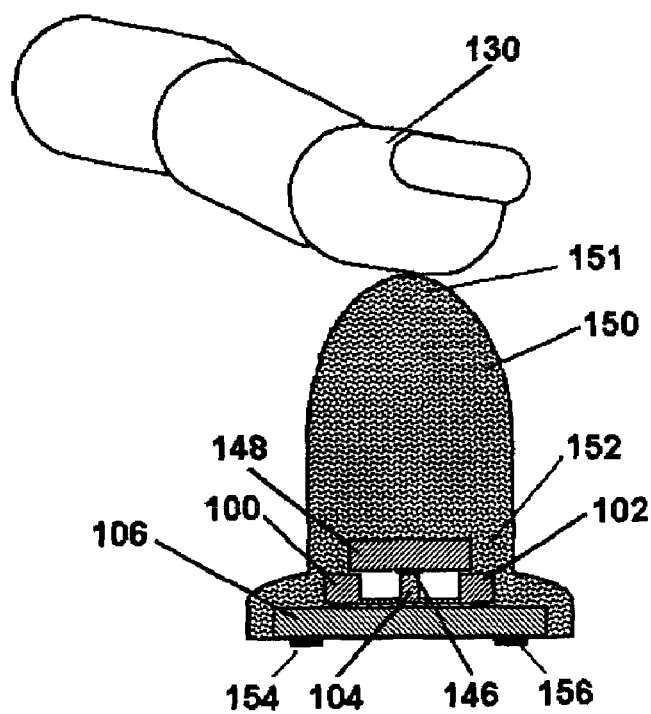
FIG. 14 shows an example of a protrusion type finger force control device based on a elastomeric protrusion body spring back deformable element directly coupled with the rigid force-transferring element transferring the force vector to the sensor die according to the eighth embodiment of the present invention.

As illustrated in FIG. 14, the spring element 150 providing required range of deflection and sensitivity can be made from the elastic plastic material according to eighth embodiment. In this embodiment the sensor die 100 and the rigid force-transferring element 148 are mounted on the substrate 106. The elastic plastic package material 150 covers the above elements and forms a flexible protrusion. The extended end of the protrusion 151 serves as a button for tactile contact. An external force applied, via finger 130, to a button 151 bends the protrusion 150 creating mechanical stress and deflection within the plastic in the device base area 152 between the sensor die and the rigid force-transferring element 148. This induced stress is transferred to the sensor die and finally to the stress sensitive IC components. This design of a micro-joystick allows achieving very low cost in production due to its design simplicity and existing well-developed mass manufacturing technologies.

Figure 15:
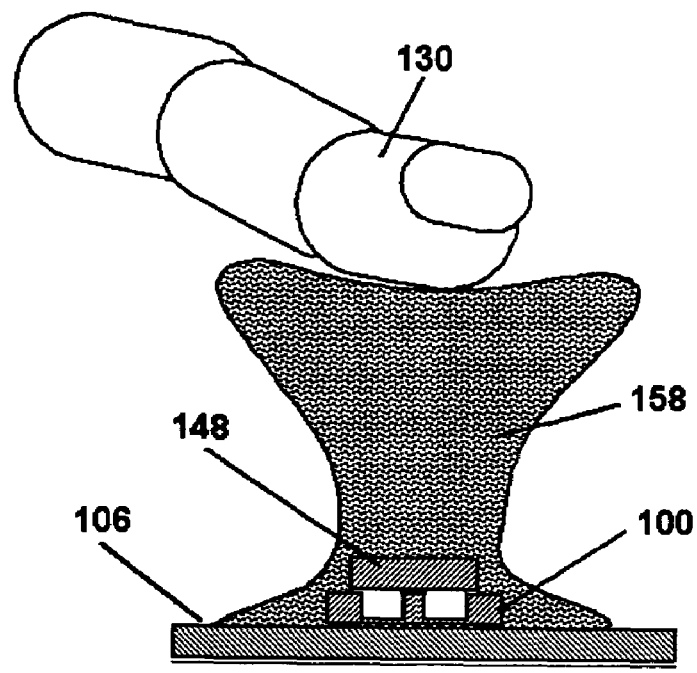
FIG. 15 shows another example of a flattened head protrusion type finger force control device according to the eighth embodiment of the present invention.
Figure 16:
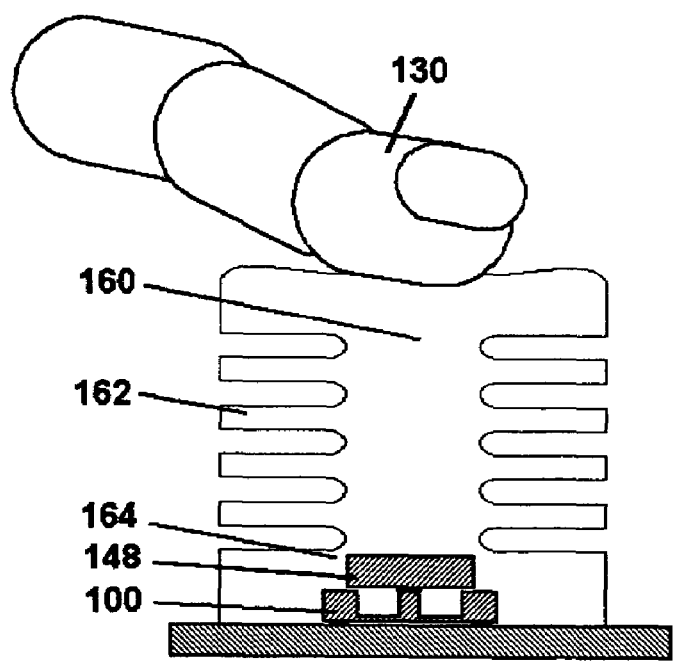
FIG. 16 shows an example of micro-construction of a flexible spine type finger force control device based on a elastic plastic spine working as an additional spring type element directly coupled to the rigid force-transferring element which is coupled to the force sensor die according to the eighth embodiment of the present invention.

Another version of the plastic elastic finger joy-stick with flattened head at the protruding end of the stick is shown in FIG. 15. The plastic stick 158 can be fabricated in various shapes, colors and elasticities depending on the application and requirements.

Although the sensor die for this application can be designed to be very reliable and robust to mechanical overload forces applied to the plastic finger joy-stick it may be required for some applications that the range of stick deflections be limited without affecting flexibility of the stick. For these kinds of applications a micro-construction of the stick using a spine design, shown in FIG. 16, can be used.

Figure 17:
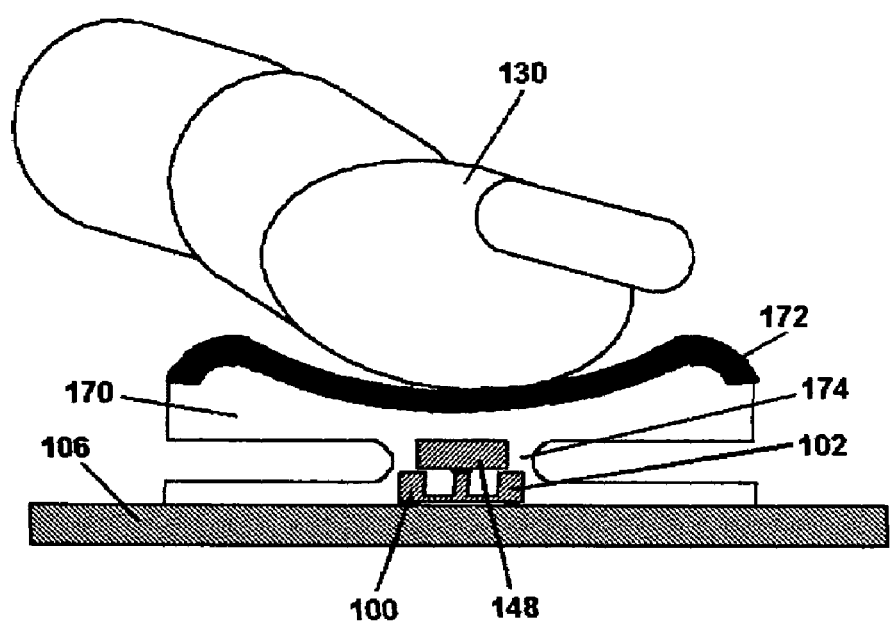
FIG. 17 shows an example of a flexing flat head finger force control device comprised of a rocking elastic plastic button directly coupled to a rigid force-transferring element which is coupled to a force sensor die and embedded in a layer of plastic which serves as an integrated button according to the ninth embodiment of the present invention.

For computer mouse applications at times there is no need for large deflections of a button as compared with joystick applications, but the height of the input control device is more important. For these applications, as illustrated in FIG. 17, the spring element providing required range of deflection and sensitivity can be made as a low profile rocking two vertebrae spine design according to a ninth embodiment. Here, the sensor die 100 with the rigid force-transferring element 148 are mounted on the substrate 106. The elastic plastic 170 covers all above elements and forms a flexible neck 174. The top surface of the button is covered with a hard layer of plastic 172 serving as a surface where an external force is applied. The force applied, for example by a finger 130, to the top hard layer 172 of the button rocks the button 170 creating the mechanical stress and deflection within the plastic in the neck area 174 between the sensor die 100 and the rigid force-transferring element 148. This stress is transferred to the sensor die and finally to the stress sensitive IC components.

Figure 18:
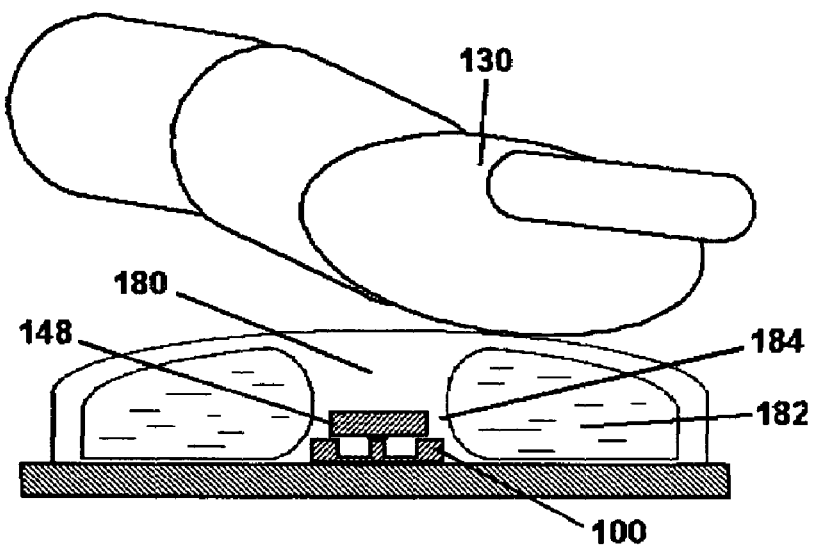
FIG. 18 shows an example of a flat head finger force control device comprised of an elastic plastic button filled with a liquid or gel and directly coupled to a force-transferring element which transfers the input or applied vector force to the force sensor die and where the force of the finger is transferred to the plastic and the sensor die through a liquid or gel according to the tenth embodiment of the present invention.
Figure 19:
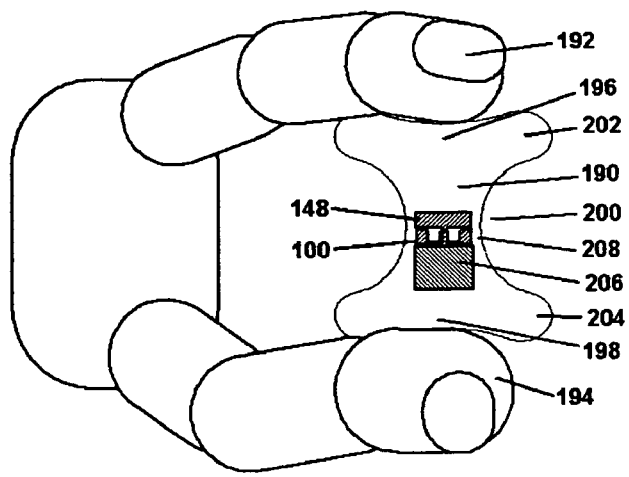
FIG. 19 shows an example of wireless finger force control device embodied in an elastic plastic package directly coupled to a rigid force-transferring element which is in turn coupled to a force sensor die and where the transmitter and a power supply are also encapsulated according to the eleventh embodiment of the present invention.

The spring element, as illustrated in FIG. 18, also can be made from the elastic plastic material filled with viscous liquid or gel according to tenth embodiment. Finger 130 applies the force to the plastic shell of the button 180. The inner cavities of the button are filled with liquid or gel 182. The central part of the elastic plastic button shell covers the sensor die 100 C. When the force is applied to a certain area of the button, then elastic shell deforms and creates an additional pressure in some of the cavities filled with liquid or gel. This pressure transfers through liquid or gel to a central portion of the shell to the area between the sensor die 100 and the rigid force-transferring element 148 transferring the finger force 130 to mechanical stress in the sensor and finally a combination of the output signals corresponding to three components of a force vector.

For some applications finger-mouse or micro-joystick input devices require IC devices for processing signals from the stress sensitive IC components. This circuitry can be integrated on the same chip or added to the input device as a separate but connected functional chip. In addition, where remote control functionality is required, wireless communication circuitry can also be added to the device, as it shown in FIG. 19, according to eleventh embodiment. Fingers 192 and 194 manipulate the wireless 3D input force control microdevice 190, the package exterior of which can be elastic plastic. The wireless input device button shape has lobe areas 202 and 204 and a neck portion 200. Fingers 192 194 contact the device in the surface areas 196 and 198. The sensor die 100 together with rigid force-transferring element 148 are located in the neck portion 200 of the device. In this wireless device design, the IC processing and wireless circuits are integrated at the sensor chip 100. A battery 206 is also encapsulated within the package. Fingers moving relative to each other creates mechanical stress in the neck portion of the wireless input device in the location 208 of the sensor die which are transferred to the rigid force-transferring element 148. From there this stress is transferred to the sensor die and stress sensitive IC components. The output signals from the sensitive components are processed by IC logic and in digital form are transmitted, as a RF signals, to a receiving controlled system. Wireless antenna and such associated technology are well known to those skilled in the art.

Figure 20:
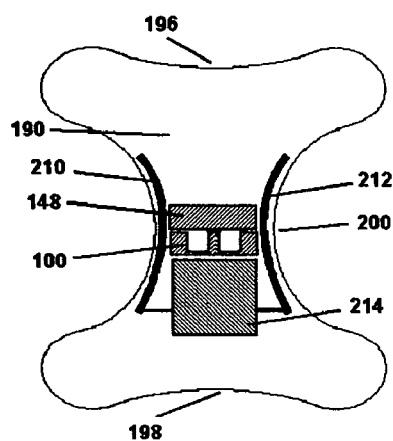
FIG. 20 shows an example of wireless battery less finger force control device based on an elastic plastic package directly connected to the rigid force-transferring element and to the force sensor die and where a transmitter, piezoelectric flexible elements and a capacitor for power storage are also encapsulated according to the twelfth embodiment of the present invention.
Figure 21:
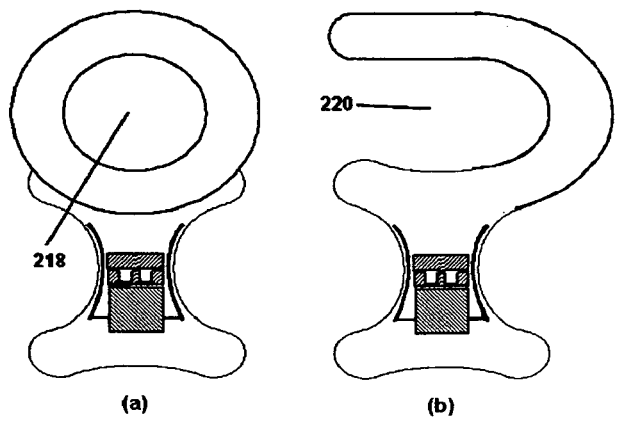
FIG. 21 shows examples of wireless battery less finger force control device constructions with different attachments to the one of the fingers according to the twelfth embodiment of the present invention.

The battery, as a power supply, limits the lifetime of the control device if it is not interchangeable. The force controlled input device in principle consumes mechanical energy, as a result of the applied force and deflection. This mechanical energy, which is otherwise wasted as heat, can be used for power generation, as it is illustrated in FIG. 20 according to twelfth embodiment. The wireless 3D force controlled input device 190 besides sensor die 100 and rigid force-transferring element 148, also has piezoelectric elements 210 212 located in the neck area 200 and lobe onset of the device. Mechanical stress and deformation is developed in these areas and therefore, a good location for piezoelectric element(s) for power generation. These piezo elements can be connected to capacitors accumulating electrical charge generated through finger flexure or button deformation.

From a practical viewpoint it might not be convenient to hold the remote button. Also the button is small and easily lost. It might may add convenience if this button were attached to one of the fingers. As it is illustrated in FIGS. 21(a)-(b), a simple addition to the button of either a ring 218 or a thimble 220.

It should be understood that the microstructures of the die, structures of the finger-mice, finger buttons and micro-joysticks do not limit the present invention, but only illustrate some of the various technical solutions covered by this invention. While the invention has been described in detail with reference to preferred embodiments, it is understood that variations and modifications thereof may be made without departing from the true spirit and scope of the invention.

What is claimed is:

1. A three-dimensional analog input control device for inputting analog mechanical signals into a digital processing system comprising:
    a sensor die formed within semiconductor substrate;
    an elastic element within said semiconductor substrate;
    a frame formed around said elastic element and coupled with at least part of the periphery of said elastic element all within the substrate;
    at least three mechanical stress sensitive IC components located in the elastic element for providing electrical output signals proportional to the mechanical stress in the location of the IC components;
    at least one rigid island element formed in the substrate and coupled with the elastic element;
    at least one rigid force-transferring element coupled to the rigid island of a sensor die which transfers an external vector force to the elastic element and through the IC components which provide electrical output signal;
    at least one spring element coupling the force-transferring element with a source of external force, and
    at least one electronic circuit for processing output signals from the mechanical stress sensitive IC components using the component signal and the electronic circuit logic in solving at least three equations with at least three unknown vector components.

2. A device of claim 1, where the semiconductor substrate is made from material chosen from the group consisting essentially of: elements from the IV group of the Periodic Table, silicon, germanium, silicon carbide, diamond like carbon, elements from III and V groups of the Periodic Table, gallium arsenide, gallium nitride, indium phosphide.

3. A device of claim 1, where the elastic element in the semiconductor substrate is having thickness and in the shape of ring or n-sided faceted geometry.

4. A device of claim 1, wherein the elastic element has a thickness of less than the substrate and surrounds the rigid island element.

5. A device of claim 1, further comprising a elastic element with at least one through opening in it's thickness dimension.

6. A device of claim 1, further comprising at least one stress concentrating element located on the elastic element and having the shape from a group of shapes consisting essentially of: V-groove, trapezoidal groove, and a groove with the sidewalls forming an angle in the range of 90°±5° with the surface of the diaphragm.

7. A device of claim 1 further comprising electronic circuits from a group of electronic circuits consisting essentially of amplifiers, multiplexers, analog-to-digital converters, digital-to-analog converters, microprocessor, flash memory, EEPROM, and I/O interface circuits.

8. A device of claim 1, further comprising rigid island element of shape from a group of shapes consisting of: cone, cylinder, semi-sphere, sphere, faceted cone, faceted cylinder, faceted semi-sphere, faceted sphere and combinations of these.

9. A device of claim 1, further comprising a rigid island element with at least one non-uniformity from a group of non-uniformities consisting of: cavity, hole, mesa, bridge, cantilever, and combinations of these.

10. A device of claim 1, further comprising a rigid force-transferring element shape from a group of shapes consisting essentially of: ring, plate, disk, beam, inverted mushroom, or cone, and force-transferring element surface, coupling the force-transferring element and a spring element through constructs from a group of constructs consisting essentially of a negative slope, cavity, hole, mesa, bridge, and cantilever.

11. A device of claim 10, further comprising an intermediate adhesive layer coupling the rigid force-transferring element and rigid island element, adhesive is chosen from a group of adhesive consisting essentially of: a polymer, a solder, a frit-glass, a negative photoresist, and a polyimide based compound.

12. A device of claim 1, further comprising a rigid force-transferring element of the material chosen from the group of materials consisting essentially of: silicon, semiconductor material, metal, alloy, plastic, glass, and ceramic.

13. A device of claim 1, further comprising a spring element chosen from the group of spring elements consisting essentially of: spring, thin beam, wire, elastic plastic button, elastic plastic stick, elastic plastic rocking button, spine-like structure, elastic dome with mechanical feedback, plastic shell filled in with liquid, plastic shell filled in with gel, and elastomeric button.

14. A device of claim 1, further comprising a least one stress sensitive IC component chosen from the group of stress sensitive IC components consisting essentially of: a piezoresistor, a pn-junction, a tunnel diode, a Schottky diode, a shear stress component, a piezoresistive Wheatstone bridge, a MOS transistor, a complementary pair of CMOS transistors, a bipolar transistor, a pair of p-n-p and n-p-n bipolar transistors, a bipolar transistor and at least one piezoresistor connected to transistor, a MOS transistor and at least one piezoresistor connected to transistor, a bipolar transistor circuit, and a CMOS transistor circuit.

15. A device of claim 1, further comprising an electronic circuit which provides functions from a group of functions consisting essentially of: analog amplifying, analog multiplexing, analog-to-digital conversion, signal processing, memory for compensation coefficients, digital interface, power management, transmitting and receiving radio-signals, and management of charging from piezoelectric elements.

16. A device as in claim 1 further comprising a wireless communication means and a power supply.

17. A device as in claim 1, further comprising:
integrated wireless communication means;
at least one piezoelectric element for generating electrical power from mechanical force applied to the button, and
at least one capacitor for storing piezoelectric generated power.

* * * * *